(12) United States Patent
BenSaleh et al.

(10) Patent No.: US 10,671,395 B2
(45) Date of Patent: Jun. 2, 2020

(54) APPLICATION SPECIFIC INSTRUCTION-SET PROCESSOR (ASIP) FOR SIMULTANEOUSLY EXECUTING A PLURALITY OF OPERATIONS USING A LONG INSTRUCTION WORD

(71) Applicant: The King Abdulaziz City for Science and Technology, Riyadh (SA)

(72) Inventors: Mohammed S BenSaleh, Riyadh (SA); Abdulfattah M Obeid, Riyadh (SA); Yousef A Alzahrani, Riyadh (SA); Ahmed F Shalash, Cairo (EG); Hossam A Fahmy, Cairo (EG); Hossam A Sayed, Cairo (EG); Mohamed A Aly, Cairo (EG)

(73) Assignee: The King Abdulaziz City for Science and Technology—KACST, Riyadh (SA)

( * ) Notice: Subject to any disclaimer, the term of this patent is extended or adjusted under 35 U.S.C. 154(b) by 452 days.

(21) Appl. No.: 15/431,493

(22) Filed: Feb. 13, 2017

(65) Prior Publication Data
US 2018/0232231 A1 Aug. 16, 2018

(51) Int. Cl.
*G06F 9/38* (2018.01)
*G06F 9/30* (2018.01)
*G06F 15/78* (2006.01)

(52) U.S. Cl.
CPC .......... *G06F 9/3802* (2013.01); *G06F 9/3001* (2013.01); *G06F 9/3016* (2013.01); *G06F 9/30032* (2013.01); *G06F 9/30098* (2013.01); *G06F 15/78* (2013.01)

(58) Field of Classification Search
None
See application file for complete search history.

(56) References Cited

U.S. PATENT DOCUMENTS

| 6,385,757 | B1 * | 5/2002 | Gupta | G06F 17/5045 |
| | | | | 716/102 |
| 6,457,173 | B1 * | 9/2002 | Gupta | G06F 9/30156 |
| | | | | 712/E9.028 |
| 7,577,820 | B1 * | 8/2009 | Wentzlaff | G06F 15/16 |
| | | | | 712/10 |
| 7,882,307 | B1 * | 2/2011 | Wentzlaff | G06F 12/0813 |
| | | | | 711/119 |
| 7,941,635 | B2 * | 5/2011 | Nguyen | G06F 9/30101 |
| | | | | 712/216 |

(Continued)

*Primary Examiner* — Michael Sun
(74) *Attorney, Agent, or Firm* — Steven M. Shape; Dennemeyer & Associates, LLC

(57) ABSTRACT

The invention provides an application specific instruction set processor (ASIP) that uses a Very Long Instruction Word (VLIW) for simultaneously executing a plurality of operations. For simultaneously executing the plurality of operations, the ASIP processor comprises a fetching unit to fetch a long instruction word from an instruction memory unit and an instruction decoder unit that interfaces with the fetching unit and a program address counter. The instruction decoder unit decodes the long instruction word fetched from the instruction memory unit and enables a plurality of sub blocks responsible for execution of a plurality of simultaneous independent operations. The instruction decoder unit of the ASIP is capable of decoding a 32-bit instruction word and executing up to six simultaneous independent operations.

14 Claims, 11 Drawing Sheets

(56) References Cited

U.S. PATENT DOCUMENTS

| | | | | |
|---|---|---|---|---|
| 8,006,204 B2* | 8/2011 | Killian | ............... | G06F 17/5045 |
| | | | | 700/1 |
| 8,327,187 B1* | 12/2012 | Metcalf | ............... | G06F 9/5022 |
| | | | | 714/10 |
| 8,738,860 B1* | 5/2014 | Griffin | ............... | G06F 12/0897 |
| | | | | 711/122 |
| 2009/0070568 A1* | 3/2009 | Shi | ..................... | G06F 9/30003 |
| | | | | 712/237 |
| 2012/0131309 A1* | 5/2012 | Johnson | .................. | G06F 9/30 |
| | | | | 712/41 |
| 2014/0351563 A1* | 11/2014 | Vorbach | ............... | G06F 9/3885 |
| | | | | 712/221 |
| 2017/0286113 A1* | 10/2017 | Shanbhogue | ....... | G06F 9/30036 |
| 2018/0285112 A1* | 10/2018 | Mekkat | .............. | G06F 9/30087 |

* cited by examiner

| Instruction | Major opcode | Minor opcode | Meaning |
| --- | --- | --- | --- |
| nothing | 0010 | 0000 | do nothing |
| cmp | 0010 | 0001 | compare |
| and | 0010 | 0010 | bitwise and |
| or | 0010 | 0011 | bitwise or |
| not | 0010 | 0100 | bitwise not |
| int add | 0010 | 0101 | integer addition |
| int sub | 0010 | 0110 | integer subtraction |
| int mul | 0010 | 0111 | integer multiplication |
| reserved | 0010 | 1000 upto 1111 | reserved for later use |

FIG. 4

| Bits | 31:28 | 27 | 26:23 | 22:19 | 18:15 | 14:11 | 10:7 | 6:3 | 2:0 |
|---|---|---|---|---|---|---|---|---|---|
| Integer Operations | 0010 | 0(reg Int-op) | op0 | op1 | op2 | op3 | op4 | op5 | not used |
| | | 1(Imm Int-op) | op0 | immediate data ||||||

FIG. 5

| Bits | 31:28 | 27 | 26 | 25 | 24 | 23:20 | 19:16 | 15:12 | 11:8 | 7:4 | 3:0 |
|---|---|---|---|---|---|---|---|---|---|---|---|
| dp | 1111 | 1 | mv0 | mv1 | mv2 | src0 | dst0 | src1 | dst1 | src2 | dst2 |

FIG. 6

| Value | operation |
|---|---|
| 0000 | do nothing |
| 0001 | reciprocal |
| 0010 | barrel shift |
| 0011 | multiply |
| 0100 | acr, inst=100, dest=bits 19:16 (or 11:8 or 3:0) |
| 0101 | acr, inst=101, dest=bits 19:16 (or 11:8 or 3:0) |
| 0110 | acr, inst=110, dest=bits 19:16 (or 11:8 or 3:0) |
| 0111 | acr, inst=111, dest=bits 19:16 (or 11:8 or 3:0) |
| 1000 | add |
| 1001 | subtract |
| 1010 | conjugate value |
| 1011 | floor |
| 1100 | ceil |
| 1101 | accumulator |
| 1110 | reserved for later use |
| 1111 | reserved for later use |

FIG. 7

| Bits | 31:28 | 27 | 26 | 25 | 24:19 | 18:13 | 12:7 | 6:1 | 0 |
|------|-------|----|----|----|-------|-------|------|-----|---|
| dp | 1111 | 0 | mvs0 | mvs1 | srcs0 | dests0 | srcs1 | dests1 | NU |

FIG. 8

APPLICATION SPECIFIC INSTRUCTION-SET PROCESSOR (ASIP) FOR SIMULTANEOUSLY EXECUTING A PLURALITY OF OPERATIONS USING A LONG INSTRUCTION WORD

FIELD OF THE INVENTION

The invention generally relates to a field of instruction sets for processors. More specifically, the invention relates to an application specific instruction set processor (ASIP) with instruction sets for simultaneously executing a plurality of operations using a long instruction word.

BACKGROUND OF THE INVENTION

Traditional processors allow programs to specify only instructions that are executed in sequence for carrying out a set of operations. Thus, these processors have lower performance and throughput as the operations are executed in a sequential manner.

Thus, simultaneously executing multiple operations is one of the most important requirements for a high-performance processor. Therefore, processor architectures are designed to take advantage of instruction level parallelism, whereby multiple instructions are executed simultaneously for carrying out a set of operations. For example, a rich set of operations can be achieved using one long instruction word (32-bit instruction word) on a single core processor. Such requirement is most important in the case of Application-Specific Instruction Set Processor (ASIP) system because of the limited resources in the system.

However, prior art processor designs support execution of only up to two simultaneous operations using 32-bit and 16-bit instruction words and the code format of such processors results in inefficient resource usage while executing the operations.

Therefore, in light of the above, there is a need for an improved application specific instruction-set processor (ASIP) design that uses a highly efficient code format for simultaneously executing a plurality of operations using a long instruction word.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the invention.

FIG. 4 illustrates a table depicting integer operations used for conditional control of the ASIP.

FIG. 5 illustrates the format of the integer operation instructions with its modes.

FIG. 6 illustrates a table of various operations of a data-path instruction that are specified by respective bit locations of a 32-bit instruction word in accordance with an embodiment of the invention.

FIG. 7 illustrates a table of operations, wherein the operations correspond to source and destination values in instruction when mv0=0(or mv1=00r mv2=0).

FIG. 8 illustrates a table of operations of specific data-path instructions that are specified by respective bit locations of a 32-bit instruction word in accordance with an embodiment of the invention.

Figure 1:
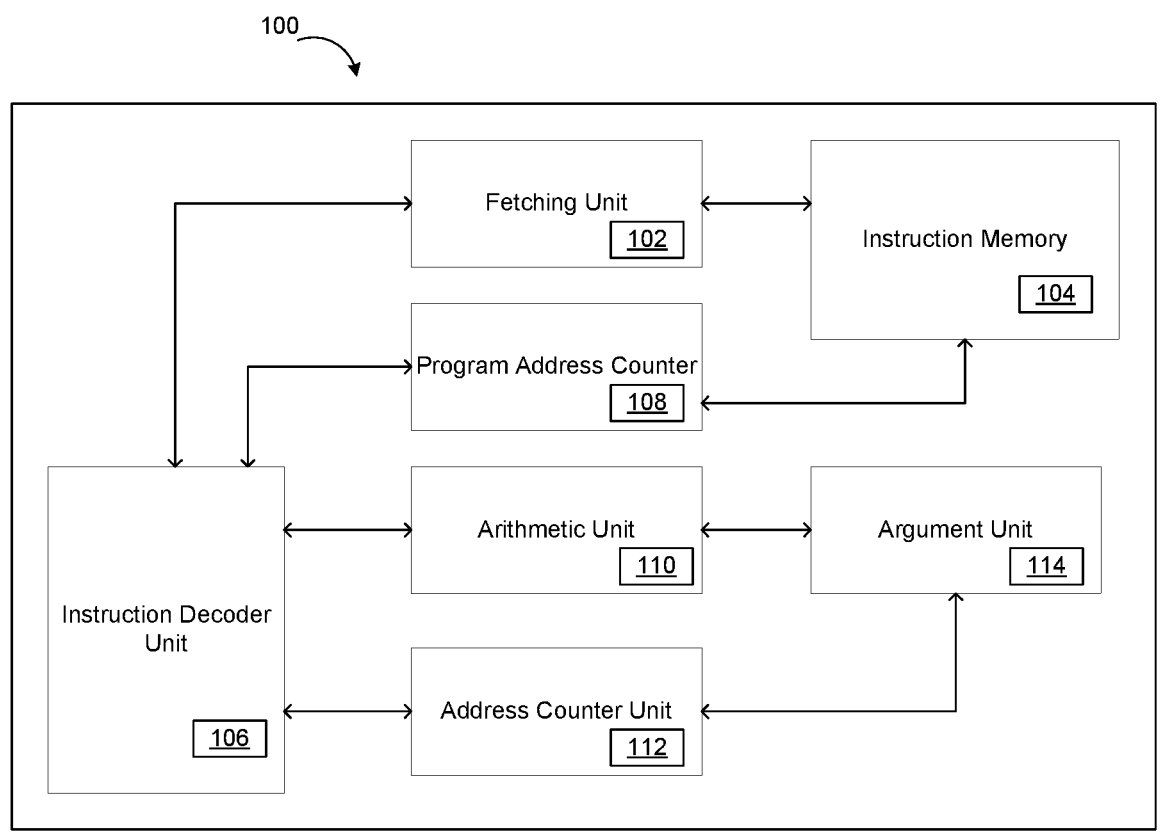
FIG. 1 illustrates an application specific instruction set processor (ASIP) that uses a Very Long Instruction Word (VLIW) for simultaneously executing a plurality of operations in accordance with an embodiment of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the invention.

DETAILED DESCRIPTION OF THE INVENTION

Before describing in detail embodiments that are in accordance with the invention, it should be observed that the embodiments reside primarily in combinations of an application specific instruction set processor (ASIP) for simultaneously executing a plurality of operations by decoding a long instruction word that includes a plurality of operations.

Accordingly, the system components and method steps have been represented where appropriate by conventional symbols in the drawings, showing only those specific details that are pertinent to understanding the embodiments of the invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article or composition that comprises a list of elements does not include only those elements but may include other elements not expressly listed or inherent to such process, method, article or composition. An element proceeded by "comprises . . . a" does not, without more constraints, preclude the existence of additional identical elements in the process, method, article or composition that comprises the element.

Various embodiments of the invention provide an application specific instruction set processor (ASIP) that uses a Very Long Instruction Word (VLIW) for simultaneously executing a plurality of operations. For simultaneously executing the plurality of operations, the ASIP processor comprises a fetching unit to fetch a long instruction word from an instruction memory unit and an instruction decoder unit that interfaces with the fetching unit and a program address counter. The instruction decoder unit decodes the long instruction word fetched from the instruction memory unit and enables a plurality of sub blocks responsible for execution of a plurality of simultaneous independent operations. The instruction decoder unit of the ASIP is capable of decoding a 32-bit instruction word and enabling execution of up to six simultaneous independent operations.

FIG. 1 illustrates an application specific instruction set processor (ASIP) 100 that uses a Very Long Instruction Word (VLIW) for simultaneously executing a plurality of operations in accordance with an embodiment of the invention.

As illustrated in FIG. 1, ASIP 100 includes a plurality of sub-blocks such as, but not be limited to, a fetching unit 102, an instruction memory unit 104, an instruction decoder unit 106, a program address counter 108, an arithmetic unit 110, an address counter unit 112 and an argument unit 114.

Fetching unit 102 is communicatively coupled to instruction memory unit 104, instruction decoder unit 106 and fetches a long instruction word from instruction memory unit 104.

The long instruction word fetched by fetching unit 102 from instruction memory unit 104 is fed into instruction decoding unit 106 that is communicatively coupled to fetching unit 102, program address counter 108, arithmetic unit 110 and address counter unit 112.

Instruction decoder unit 106 decodes the long instruction word fetched from instruction memory unit 104 and enables the plurality of sub-blocks responsible for execution of a plurality of simultaneous independent operations.

Further, instruction decoder unit 106 decodes a 32-bit instruction word for executing up to six simultaneous independent operations. Also, the long instruction word is decoded without using a translation circuitry.

Further, the long instruction word includes operational fields for each operation of a plurality of operations without having to specify operands for the plurality of operations. The plurality of operations have a set of input registers and a set of output registers that are implicitly specified in the long instruction word.

By decoding the long instruction word, instruction decoder unit 106 determines the plurality of operations to be executed that are specified within the long instruction word. Instruction decoder unit 106, then, assigns the plurality of operations to program address counter 108, arithmetic unit 110 and address counter unit 112 for executing the plurality of operations.

Figure 3:
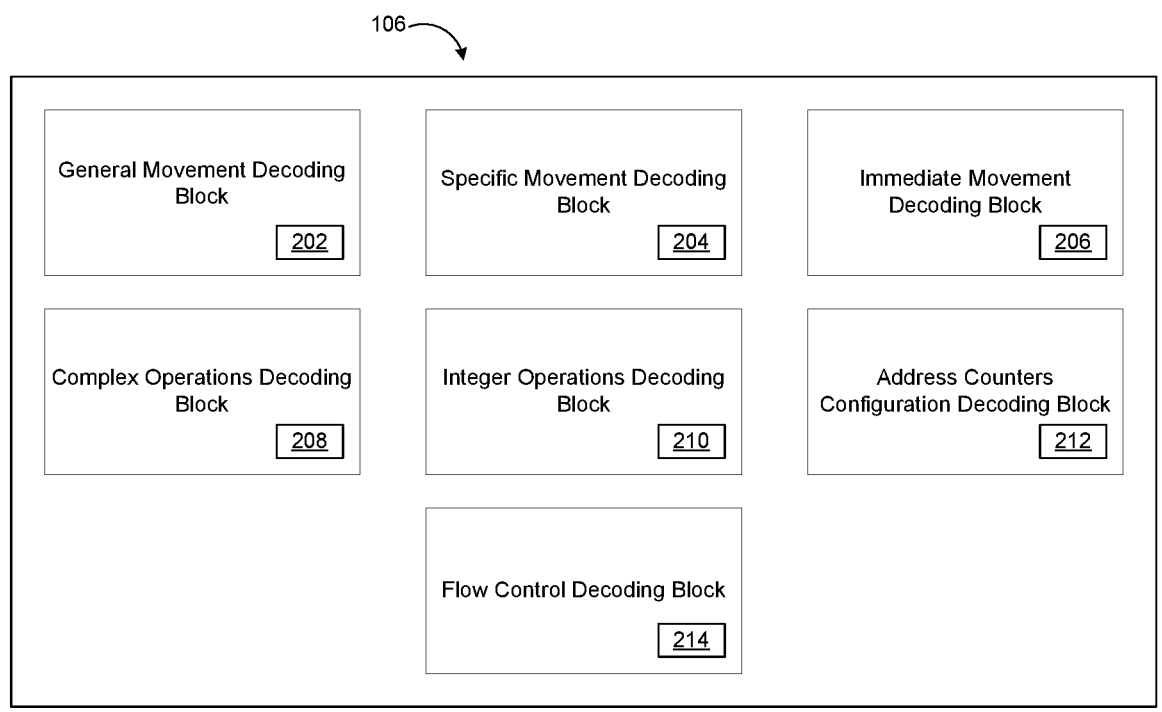
FIG. 3 illustrates an instruction decoder unit of an ASIP for decoding a plurality of instructions for simultaneously executing a plurality of operations in accordance with an embodiment of the invention.

Instruction decoder unit 106 of ASIP 100 is further described in detail in conjunction with FIG. 3.

Program address counter 108 of ASIP 100 communicatively coupled to fetching unit 102, instruction memory 104 and instruction decoder unit 106 processes flow control operations that are specified by instruction decoder unit 106.

A latency of program address counter 108 is two clock cycles. The first clock cycle is for loading enables and sub instructions that are specified by instruction decoding unit 106 from the long instruction word and the second clock cycle is for applying results to the output specific registers.

Further, program address counter 108 processes the flow control instructions to provide an address of a next instruction word to be fetched. Program address counter 108 enables instruction memory unit 104 to provide an instruction to be fetched to fetching unit 102 by applying a program address counter signal to instruction memory unit 104. Also program address counter 108 controls a loop instruction.

Moving on, arithmetic unit 110 communicatively coupled to instruction decoder unit 106 and argument unit 114 processes the plurality of operations that are assigned by instruction decoder 106 using sub-modules.

Figure 2:
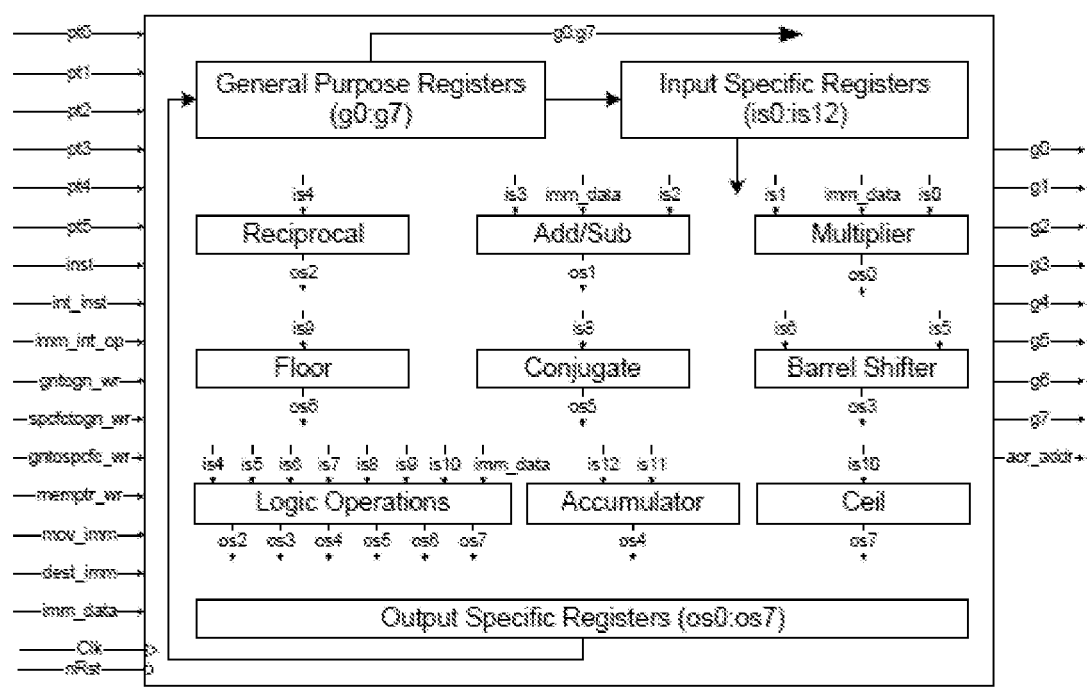
FIG. 2 illustrates various sub-modules of arithmetic unit.

FIG. 2 illustrates the various sub-modules of arithmetic unit 110.

The sub-modules include, but need not be limited to, general purpose registers, specific registers including input specific registers and output specific registers, an adder and subtractor, a multiplier, a barrel shifter, a reciprocal block, a floor block, a ceil block, a conjugate block, an accumulator, logic operations block and integer operations block.

Arithmetic unit 110 processes all the complex and integer operations and the data moving operations between both general and specific registers.

Further, the latency of the operations performed by arithmetic unit 110 is two clock cycles. The first clock cycle is used for loading enables and sub instructions that are specified by instruction decoder unit 106 from the long instruction word and the second clock cycle is for applying results to the output specific registers.

Moving on, address counter unit 112 of ASIP 100 communicatively coupled to instruction decoder unit 106 processes the address counter configuration operations that are specified by instruction decoder unit 106.

The latency of address counter unit 112 is two clock cycles. The first clock cycle is for loading enables and sub-instructions that are specified by instruction decoder unit 106 from the long instruction word and the second clock cycle is for applying instructions or configurations to address counters.

Further, argument unit 114 of ASIP 100 communicatively coupled with arithmetic unit 110 and address counter unit 112 processes data moving operations to output data ports that are specified by instruction decoder unit 106. Instruction decoder unit 106 assigns the data moving operations to output data ports to arithmetic unit 110 that further assigns to argument unit 110 for further execution of the data moving operations to output data ports.

Argument unit 114 also handles the data ports that are responsible for moving data from the set of general registers to output data ports and also for moving an immediate data that is specified within the long instruction to the output data ports.

The latency of argument unit 114 is two clock cycles. The first clock cycle is for loading enables and sub-instructions that are specified by instruction decoder unit 106 from the instruction word and the second clock cycle is for outputting the data or address outside the ASIP 100.

FIG. 3 illustrates instruction decoder unit 106 of ASIP 100 for decoding a plurality of instructions for simultaneously executing a plurality of operations in accordance with an embodiment of the invention.

Instruction decoder unit 106 decodes a plurality of different types of operations specified in an instruction word by providing enable bits to the plurality of sub-blocks responsible for executing the plurality of different types of operations. Then, instruction decoder 106 provides encoded sub-instructions to the plurality of sub-blocks for executing the plurality of different types of operations.

The plurality of different types of operations specified in the instruction word include one of operations such as, but need not be limited to, data moving operation to and from a set of general purpose registers, a data moving operation to a set of specific input registers, a data moving operation from a set of specific output registers, a data moving operation to a set of output ports, an immediate data moving operation to a set of general purpose registers and a set of output ports, a set of complex arithmetic operations, a set of integer operations, a set of address counters configuration operations and a set of flow control operations.

In order to decode the plurality of different types of operations, instruction decoder unit 106 includes a general movement decoding block 202, a specific movement decoding block 204, an immediate movement decoding block 206, a complex operations decoding block 208, an integer operations decoding block 210, an address counters configuration decoding block 212 and flow control decoding block 214.

Moving on, general movement decoding block 202 of instruction decoder unit 106 decodes general data moving operations. The general data moving operations include accepting data from source registers such as, but need not be limited to, general purpose registers, input ports, frames, stacks and pointer registers and moving the data to general purpose registers.

Further, general movement decoding block 202 utilizes a data-path instruction to decode the general data moving operations. After decoding the general data moving operations, general movement decoding block 202 transmits the mapping location of source registers/source mapping location to arithmetic unit 110 through a compressed control bus.

Moving on, specific movement decoding block 204 of instruction decoder unit 106 decodes specific data moving operations. The specific data moving operations include moving data from output specific registers to general purpose registers.

Further, specific movement decoding block 204 utilizes specific data-path instructions to decode the specific data moving operations. After decoding the specific data moving operations, specific movement decoding block 204 transmits the mapping location of source registers/source address location to arithmetic unit 110 through a compressed control bus.

Additionally, specific movement decoding block 204 decodes data moving operations to output data ports. The data moving operations to output ports includes moving data from general purpose registers and immediate data derived within a long instruction word through an immediate moving instruction to the output data ports.

Moving on, immediate moving decoding block 206 of instruction decoder unit 106 decodes immediate data moving operations. The immediate data moving operation includes moving an intermediate data derived within a long instruction word to general purpose registers and output data ports. After decoding the immediate data moving operations, immediate moving decoding block 206 transmits enables to arithmetic unit 110 for moving immediate data to general registers and transmits enables to argument unit 114 for moving immediate data to output ports.

Further, complex operations decoding block 208 of instruction decoder unit 106 decodes complex arithmetic operations. The complex arithmetic operations include, but need not be limited to, reciprocal, barrel shift, complex multiplication, complex addition, complex subtraction, conjugate value, floor, ceil and accumulator operation.

Complex operations decoding block 208 decodes enable flags for blocks that perform complex arithmetic operations. Complex operations decoding block 208 decodes an enable flag based on a data-path instruction and control bit values of the data-path instruction.

Further, complex operations decoding block 208 concatenates all enables in an arithmetic instruction and transmits to arithmetic unit 110.

Moving on, integer operations decoding block 210 of instruction decoder unit 106 decodes integer operations. The integer operations include, but need not be limited to, integer comparators, bit-wise and, bitwise or, bitwise not, integer addition, integer subtraction and integer multiplication.

Further, integer operations decoding block 210 decodes enable flags for blocks that perform integer operations and enables an immediate integer operation flag. Then, integer operations decoding block 210 concatenates all enables in an arithmetic instruction and transmits to arithmetic unit 110.

FIG. 4 illustrates a table depicting integer operations used for conditional control of ASIP 100.

The integer operation instructions support two modes of operations. The first mode supports immediate integer operations between specific register dedicated for each operation and immediate value provided within the instruction word. The second mode supports registered integer operations between two specific register dedicated for each operation.

The registered integer operation supports up to six parallel operations within the same instruction word, but the immediate integer operation supports only one operation.

FIG. 5 illustrates the format of the integer operation instructions with its modes.

The integer operation instructions support two modes of operations. The first mode supports immediate integer operations between specific register dedicated for each operation and immediate value provided within the instruction word. The second mode supports registered integer operations between two specific registers dedicated for each operation.

As illustrated in FIG. 5, the bits 31:28 provide the major opcode with 0010 followed by bit "27" indicating the mode of operation, '0' for registered integer operation and '1' for immediate integer operation. The bits 26:23(op0), 22:19(op1), 18:15(op2), 14:11(op3), 10:7(op4) and 6:3(op5) give the types of operations to be processed in parallel in registered integer operation mode. The bits 26:23(op0) give the type of the immediate integer operation and the bits 22:0 give the immediate data to be processed in the immediate operation.

Moving on, address counters configuration decoding block 212 of instruction decoder unit 106 decodes operations that are required for configurations of address counters. After decoding, address counters configuration decoding block 212 sends enables to address counter unit 112.

Moving on, flow control decoding block 214 of instruction decoder unit 106 decodes flow control instructions. The flow control instructions control a flow of instructions or program that needs to be executed. The flow control instructions include, but need not be limited to, instructions for controlling loop, instructions for assigning address counters to address ports, call instructions, return instructions, unconditional jump instructions and conditional jump instructions.

Further, flow control decoding block 214 decodes enables for executing the flow control instructions in accordance with a minor op-code for a required flow instruction to be processed and transmits the enables to program address counter 108.

FIG. 6 illustrates a table of various operations of a data-path instruction (dp) that are specified by respective bit locations of a 32-bit instruction word in accordance with an embodiment of the invention.

As illustrated in FIG. 6, the data-path instruction defines functionality of ASIP 100. For data-path instruction, the 32-bit instruction word specifies up to three sub-instructions for move operation and up to six sub-instructions for other operations without stating any operands. The bit locations of the 32-bit instruction word specify the various operations for data-path instruction.

Bits 31 to 28 [31:28] in the 32-bit instruction word specify the format of the operational code for the data-path instruction and represented as '1111'. Subsequently, a bit 27 in the 32-bit instruction word indicates whether the instruction is a general data-path instruction or a specific movement instruction. If the bit 27 is "1", then the instructions are a general data-path instruction. The general data-path instruction specifies data moving operations between general purpose registers, input data ports and output data ports or other operations according to FIG. 3.

A bit 26 in the 32-bit instruction word controls handling of bits from 23 to 16 [23:16]. Similarly, a bit 25 in the 32-bit instruction word controls handling of bits from 15 to 8 [15:8] and a bit 24 in the 32-bit instruction word controls handling of bits from 7 to 0 [7:0].

Bits 23 to 20 [23:20], bits 15 to 12 [15:12] and bits 7 to 4 [7:4] in the 32-bit instruction word specify source fields "src0", "src1" and "src2" respectively. Similarly, bits 19 to 16 [19:16], bits 11 to 8 [11:8] and bits 3 to 0 [3:0] in the 32-bit instruction word specify destination fields "dest0", "dest1" and "dest2" respectively.

For instance, if the data-path instruction mv0 specified at bit 26 is 1, then, the data-path instruction specifies data moving operation from source "src0" addressed by the bits [23:20] to a destination "dst0" addressed by the bits [19:16]. Similarly, if the data-path instruction mv1 specified at bit 25 is 1, then the data-path instruction specifies data moving operation from source "src1" addressed by the bits [15:12] to a destination "dst1" addressed by the bits [11:8]. Likely, if the data-path instruction mv2 specified at bit 24 is 1, then the data-path instruction specifies data moving operation from source "src2" addressed by the bits [7:4] to a destination "dst2" addressed by the bits [3:0].

In an exemplary embodiment, fetching unit 102 fetches a long instruction word "fe4c5d00" and the long instruction word "fe4c5d00" is fed into instruction decoder unit 106. Instruction decoder unit 106 decodes the long instruction word "fe4c5d00" in order to determine the plurality of simultaneous independent operations specified in the long instruction word "fe4c5d00".

Further, instruction decoder unit 106 decodes the long instruction word "fe4c5d00" by determining a data-path instruction from an operation code of the "fe4c5d00" and checks three control bits mv0, mv1 and mv2 as illustrated in FIG. 3.

For the long instruction word "fe4c5d00", values of the three control bits are mv0='1', mv1='1' and mv2='0'. Thus, instruction decoder unit 106 determines two simultaneous data moving operations for the long instruction word "fe4c5d00" and specifies the two simultaneous data moving operations. The two simultaneous data moving operation includes moving data from src0=4 to dest0=c and simultaneously from src1=5 to dest1=d. Thus, the three control bits' controls six simultaneous data moving operations, where each control bit of the control bits' controls two simultaneous data-path operations.

Further, instruction decoder unit 106 generates source and destination register address and provides the source and destination register addresses to arithmetic unit 110 for further execution of the two simultaneous data-path operations.

Moving on, if the values of the three control bits are '0'. Then instruction decoder unit 106 determines that operations specified in a long instruction word includes complex arithmetic operations and integer operations. Further, instruction decoder unit 106 determines a kind of operation to be executed based on values of the source and destination fields "src0", "src1", "src2", "dest0", "dest1" and "dest2" respectively. This is the case of six operations packed in one instruction.

FIG. 7 illustrates a table of operations, wherein the operations correspond to source and destination values in instruction when mv0=0 (or mv1=0 or mv2=0).

As illustrated in FIG. 7, the operations such as complex arithmetic operations and integer operations are determined based on values of source fields src0 or src1 or src2 of data-path instruction. The values of the source fields src0 or src1 or src2 or dest0 or dest1 or dest2 of data-path instruction. The values of the source and destination fields src0, dest0, src1, dest1, src2 and dest2 are specified by bits 23 to 20 [23:20], 19 to 16 [19:16], bits 15 to 12 [15:12], bits 11 to 8 [11:8], bits 7 to 4 [7:4] and bits 3 to 0 [3:0] of the 32-bit instruction word respectively. For the operations such as complex arithmetic operations and integer operations, move fields mv0, mv1 and mv2 are specified by '0' in the 32-bit instruction word.

For example, if source value or destination value is equal to "0000", then operations are not determined. If values of source or destination fields are "0001", "0010" and "0011", then determined operations to be executed are reciprocal operations, barrel shift operations and multiplication operations respectively.

Similarly, if values of source or destination fields are "0100", "0101", "0110" and "0111", then determined operations are related to an address counter instruction. If values of source or destination fields are "1000", "1001", "1010", "1011", "1100" and "1101", then determined operations includes addition operations, subtraction operations, conjugate operations, floor operations, ceil operations and accumulation operations respectively. Values of source or destination fields "1110" and "1111" are reserved for a later use. The above determined operations are further executed by arithmetic unit 110. Also the determined operations can occur at a same time up to six operations.

FIG. 8 illustrates a table of various operations of specific data-path instructions (dps) that are specified by respective bit locations of a 32-bit instruction word in accordance with an embodiment of the invention.

As illustrated in FIG. 8, the specific data-path instructions are used to decode specific data movement operations. For the specific data-path instructions, the 32-bit instruction word specifies two sub-instructions.

Similar to a data-path instruction, bits 31 to 28 [31:28] in the 32-bit instruction word specify the format of the operational code for the specific data-path instructions and represented as '1111'. Subsequently, a bit 27 in the 32-bit instruction word is '0' representing a specific data movement instruction.

A bit 26 in the 32-bit instruction word controls handling of bits from 24 to 13 [24:13]. Similarly, a bit 25 in the 32-bit instruction word controls handling of bits from 12 to 2 [12:1].

Bits 24 to 19 [24:19] and bits 18 to 13 [18:13] in the 32-bit instruction word specify source field "srcs0" and destination field "dests0" respectively. Similarly, bits 12 to 7 [12:7], bits 6 to 1 [6:1] in the 32-bit instruction word specify source and destination fields srcs1 and dests1. A bit 0 in the 32-bit instruction is not used.

For instance, if the specific data-path instruction mvs0 specified at bit 26 is 1, then the specific data-path instruction specifies data moving operation from source "srcs0" addressed by the bits [24:19] to a destination "dsts0" addressed by the bits [18:13].

In another exemplary embodiment, fetching unit 102 fetches a long instruction word "f6010092" and the long instruction word "f6010092" is fed into instruction decoder unit 106. Instruction decoder unit decodes the long instruction word "f6010092" in order to determine a plurality of simultaneous independent operations specified in the long instruction word "f6010092" that needs to be executed.

Further, instruction decoder unit 106 decodes the long instruction word "f6010092 by determining specific datapath instructions from an operation code (op-code) of the "f6010092" and checks control bits mvs0 and mvs1 as illustrated in FIG. 5.

For the long instruction word "f6010092", values of the control bits are mvs0='1' and mvs1='1'. Thus, instruction decoder unit 106 determines two simultaneous specific data moving operations for the long instruction word "f6010092" and specifies the two data moving operations for arithmetic unit 110 to execute. The two simultaneous specific data moving operation includes moving data from srcs0=0 to dests0=8 and simultaneously from srcs1=1 to dests1=9.

Figure 9:
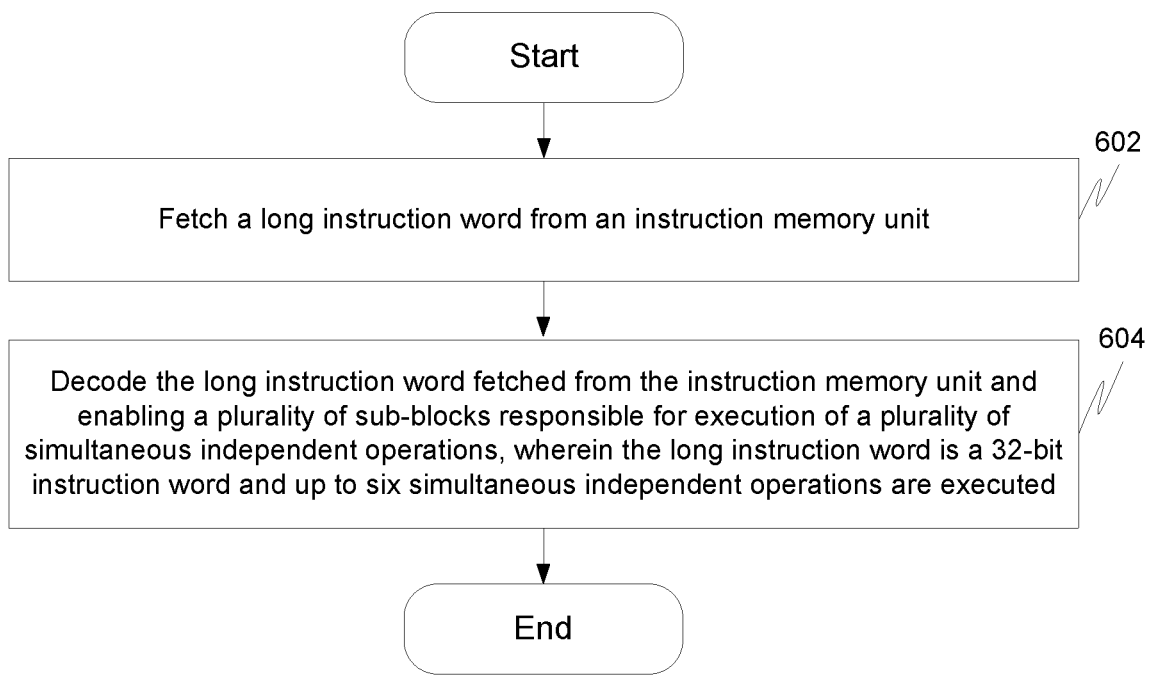
FIG. 9 illustrates a flowchart for simultaneously executing a plurality of operations in an application specific instruction set processor (ASIP) that uses a Very Long Instruction Word (VLIW) in accordance with an embodiment of the invention.

FIG. 9 illustrates a flowchart for simultaneously executing a plurality of operations in an application specific instruction set processor that uses a Very Long Instruction Word in accordance with an embodiment of the invention.

At step 602, a long instruction word is fetched by fetching unit 102 from instruction memory unit 104.

Thereafter at step 604, the long instruction word fetched by fetching unit 102 from instruction memory unit 104 is decoded by instruction decoding unit 106 and plurality of sub blocks are enabled by instruction decoding unit 106 that are responsible for execution of a plurality of simultaneous independent operations. Instruction decoder unit 106 of ASIP 100 is capable of decoding a 32-bit instruction word and executing up to six simultaneous independent operations.

Figure 10:
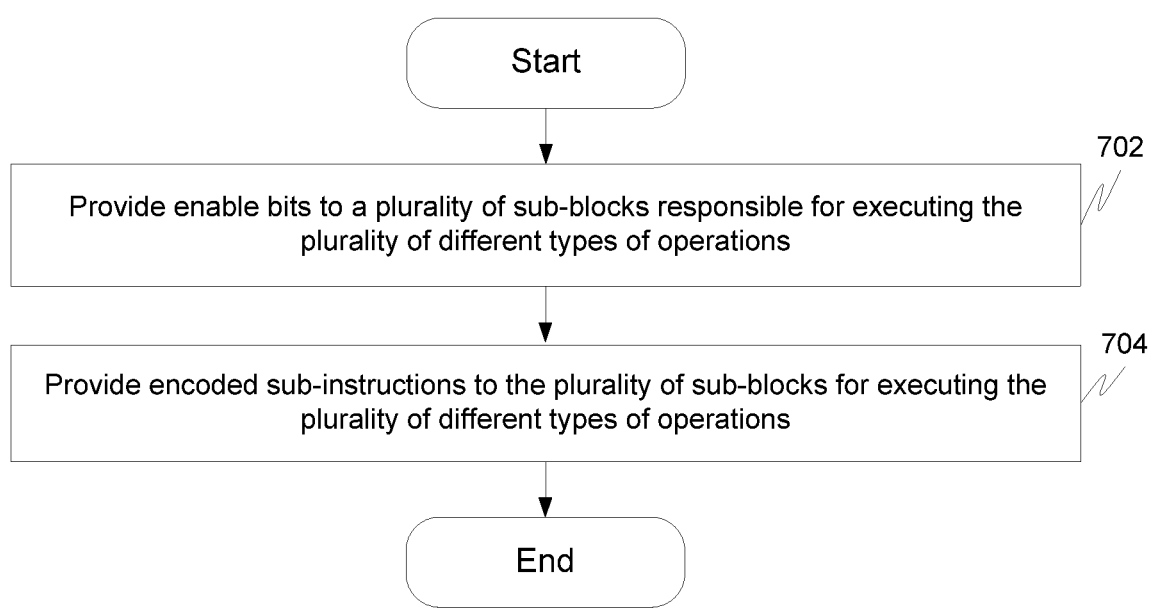
FIG. 10 illustrates a flowchart for decoding a plurality of different types of operations specified in a long instruction word in accordance with an embodiment of the invention.

FIG. 10 illustrates a flowchart for decoding a plurality of different types of operations specified in an instruction word in accordance with an embodiment of the invention.

At step 702, enable bits are provided to a plurality of sub-blocks by instruction decoder unit 106 that are responsible for executing the plurality of different types of operations.

At step 704, encoded sub-instructions are then provided to the plurality of sub-blocks by instruction decoder unit 106 for executing the plurality of different types of operations.

Figure 11:
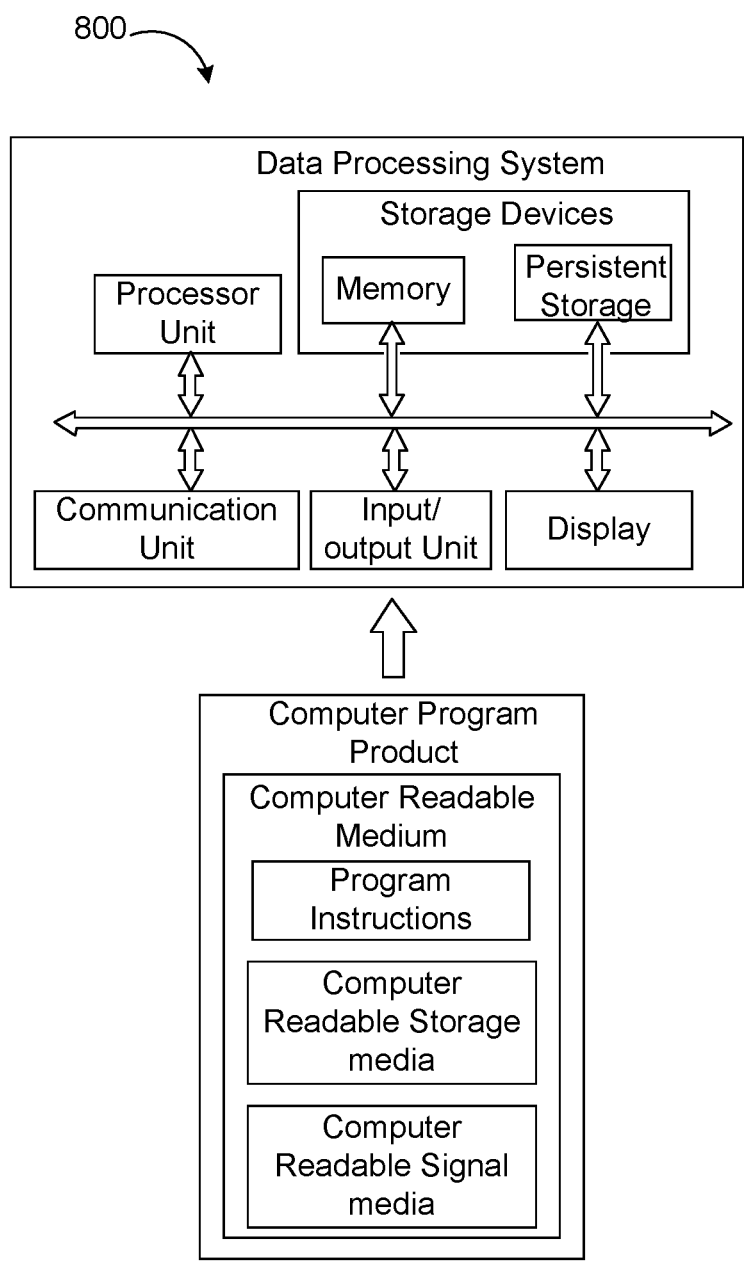
FIG. 11 illustrates a computer program product for simultaneously executing a plurality of operations in an application specific instruction set processor (ASIP) that uses a Very Long Instruction Word (VLIW) in accordance with an embodiment of the invention.

FIG. 11 illustrates a computer program product 800 for simultaneously executing a plurality of operations in an application specific instruction set processor that uses a Very Long Instruction Word in accordance with an embodiment of the invention.

An embodiment of the present invention may relate to computer program product 800 with a non-transitory computer readable medium having program instructions thereon for performing various computer-implemented operations of the method and/or system disclosed herein. The computer readable storage media and program instructions may be those specially designed and constructed for the purposes of the method and/or system disclosed herein, or, they may be of the kind well known and available to those having skill in the computer software arts. Examples of computer-readable storage media include, but are not limited to, magnetic media, optical media, magneto-optical media and hardware devices that are specially configured to store and execute program instructions. Examples of program instructions include machine code, such as produced by a compiler, and files containing higher-level code that are executed by a computer using an interpreter. For example, an embodiment of the present invention may be implemented using JAVA®, C++, or other object-oriented programming language and development tools. Aspects of the present invention may also be implemented using Hypertext Transport Protocol (HTTP), Procedural Scripting Languages and the like.

The present invention increases performance of an application specific instruction set processor (ASIP) and increases throughput by executing multiple independent operations simultaneously, thus leading to efficient resource utilization.

The ASIP with single instruction set and limited registers executes up to six simultaneous independent operations using a 32-bit instruction word. The 32-bit instruction word includes multiple independent operations grouped together.

The ASIP accepts the 32-bit instruction word from an instruction memory for each cycle and an internal decoder of ASIP performs decoding by decompressing the 32-bit instruction word to an instruction bundle that are processed simultaneously. The 32-bit instruction word is decoded without using any translator circuitry.

The internal decoder of the ASIP determines a data-path instruction from an op-code of the 32-bit instruction and determines the multiple independent operations specified in the 32-bit instruction word. Each operation specified in the 32-bit instruction circuitry is aligned to sub-blocks of the ASIP (arithmetic unit, address counters and program address counters). Also, specific input and output registers are specified to each sub-block, thus, eliminating a need of specifying operands in the 32-bit instruction word.

The invention provides up to three moving sub instructions and six sub-instructions for operations such as complex arithmetic and integer operations. Each sub-instruction indicates one operand state without specifying any operands in the 32-bit instruction word. Thus, resulting in a usage of highly efficient code format that further results in an efficient utilization of resources for executing the multiple independent operations.

Those skilled in the art will realize that the above recognized advantages and other advantages described herein are merely exemplary and are not meant to be a complete rendering of all of the advantages of the various embodiments of the invention.

The system, as described in the invention or any of its components may be embodied in the form of a computing device. The computing device can be, for example, but not limited to, a general-purpose computer, a programmed microprocessor, a micro-controller, a peripheral integrated circuit element, and other devices or arrangements of devices, which are capable of implementing the steps that constitute the method of the invention. The computing device includes a processor, a memory, a nonvolatile data storage, a display, and a user interface.

In the foregoing specification, specific embodiments of the invention have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of the invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. An application specific instruction-set processor (ASIP) that uses a Very Long Instruction Word (VLIW) for simultaneously executing a plurality of operations, comprising:
a fetching unit to fetch a 32-bit instruction word from an instruction memory unit; and
an instruction decoder unit that interfaces with the fetching unit and a program address counter, wherein the instruction decoder unit decodes the 32-bit instruction word fetched from the instruction memory unit to determine a data-path instruction from an op-code of the 32-bit instruction and a plurality of operations specified in the 32-bit instruction word, and assigns the plurality of operations to a plurality of sub-blocks of the ASIP responsible for simultaneous and independent execution of the plurality of operations, wherein the 32-bit instruction word includes a specific input register and a specific output register specified for each sub-block of the plurality of sub-blocks and up to six operations are executed simultaneously and independently of other operations.

2. The processor according to claim 1, wherein the 32-bit instruction word is decoded without using a translation circuitry.

3. The processor according to claim 1, wherein the 32-bit instruction word comprises operational fields for each operation of the plurality of operations without having to specify operands for the plurality of operations.

4. The processor according to claim 1, wherein each sub-block is responsible for execution of an independent operation.

5. The processor according to claim 1, wherein the instruction decoder unit decodes a plurality of different types of operations specified in the 32-bit instruction word by:
providing enable bits to the plurality of sub-blocks responsible for executing the plurality of different types of operations; and
providing encoded sub-instructions to the plurality of sub-blocks for executing the plurality of different types of operations.

6. The processor according to claim 5, wherein the plurality of different types of operations specified in the 32-bit instruction word include one of a data moving operation to a set of general purpose registers, a data moving operation to a set of specific registers, a data moving operation to a set of output ports, an immediate data moving operation to a set of general purpose registers and a set of output ports, a set of complex arithmetic operations, a set of integer operations, a set of address counters configuration operations and a set of flow control operations.

7. The processor according to claim 1, wherein the program address counter provides an address of a next instruction word to be fetched.

8. The processor according to claim 1, further comprising an arithmetic unit for processing complex and integer operations, wherein the arithmetic unit performs data moving operations between a set of general purpose registers and a set of specific registers.

9. A method for simultaneously executing a plurality of operations in an application specific instruction-set processor (ASIP) that uses a Very Long Instruction Word (VLIW), the method comprising:
fetching, by one or more units, a 32-bit instruction word from an instruction memory unit;
decoding, by one or more units, the 32-bit instruction word fetched from the instruction memory unit to determine a data-path instruction from an op-code of the 32-bit instruction and a plurality of operations specified in the 32-bit instruction word; and
assigning the plurality of operations to a plurality of sub-blocks of the ASIP responsible for simultaneous and independent execution of the plurality of operations, wherein the 32-bit instruction word includes a specific input register and a specific output register specified for each sub-block of the plurality of sub-blocks and up to six operations are executed simultaneously and independently of other operations.

10. The method according to claim 9, wherein fetching the 32-bit instruction word comprises adjusting a program address counter to a program memory.

11. The method according to claim 9, wherein decoding the 32-bit instruction word is done by one of an instruction decoder unit and one or more sub-instructions provided by an arithmetic unit.

12. The method according to claim 9, further comprises decoding, by one or more units, a plurality of different types of operations specified in the 32-bit instruction word by:
providing, by one or more units, enable bits to a plurality of sub-blocks responsible for executing the plurality of different types of operations; and
providing, by one or more units, encoded sub-instructions to the plurality of sub-blocks for executing the plurality of different types of operations.

13. A computer program product for simultaneously executing a plurality of operations in an application specific instruction-set processor (ASIP) that uses a Very Long Instruction Word (VLIW), the computer program product comprising a non-transitory computer readable storage medium having program instructions stored therein, the program instructions readable/executable by one or more units to cause the one or more units to:
fetch a 32-bit instruction word from an instruction memory unit;
decode the 32-bit instruction word fetched from the instruction memory unit to determine a data-path instruction from an op-code of the 32-bit instruction and a plurality of operations specified in the 32-bit instruction word; and
assign the plurality of operations to a plurality of sub-blocks of the ASIP responsible for simultaneous and independent execution of the plurality of operations, wherein the 32-bit instruction word includes a specific input register and a specific output register specified for each sub-block of the plurality of sub-blocks and up to six operations are executed simultaneously and independently of other operations.

14. The computer program product according to claim 13, wherein the program instructions further cause the one or more units to decode a plurality of different types of operations specified in the 32-bit instruction word by:
providing enable bits to a plurality of sub-blocks responsible for executing the plurality of different types of operations; and
providing encoded sub-instructions to the plurality of sub-blocks for executing the plurality of different types of operations.

* * * * *